(12) United States Patent
Aldrich et al.

(10) Patent No.: US 10,846,291 B2
(45) Date of Patent: Nov. 24, 2020

(54) TRANSFORMING A USER-DEFINED TABLE FUNCTION TO A DERIVED TABLE IN A DATABASE MANAGEMENT SYSTEM

(71) Applicant: Alibaba Group Holding Limited, George Town (KY)

(72) Inventors: Craig S. Aldrich, Rochester, MN (US); Stephanie A. Burrichter, Rochester, MN (US); Scott P. Hanson, Rochester, MN (US); Rafal P. Konik, Oronoco, MN (US); Roger A. Mittelstadt, Byron, MN (US); Jane A. Vold, Byron, MN (US)

(73) Assignee: Alibaba Group Holding Limited, Grand Cayman (KY)

( * ) Notice: Subject to any disclaimer, the term of this patent is extended or adjusted under 35 U.S.C. 154(b) by 20 days.

(21) Appl. No.: 16/388,477

(22) Filed: Apr. 18, 2019

(65) Prior Publication Data
US 2019/0243833 A1 Aug. 8, 2019

Related U.S. Application Data

(63) Continuation of application No. 15/406,678, filed on Jan. 14, 2017, now Pat. No. 10,558,662.

(51) Int. Cl.
*G06F 17/00* (2019.01)
*G06F 16/2453* (2019.01)
*G06F 16/22* (2019.01)

(52) U.S. Cl.
CPC .... *G06F 16/24542* (2019.01); *G06F 16/2282* (2019.01)

(58) Field of Classification Search
CPC .................. G06F 16/24542; G06F 16/2282
See application file for complete search history.

(56) References Cited

U.S. PATENT DOCUMENTS

| | | | |
|---|---|---|---|
| 5,822,750 | A | 10/1998 | Jou et al. |
| 5,930,795 | A | 7/1999 | Chen et al. |
| 6,826,562 | B1 | 11/2004 | Leung et al. |
| 8,032,546 | B2 | 10/2011 | Arasu et al. |
| 9,355,145 | B2 | 5/2016 | George |
| 9,619,537 | B2 | 4/2017 | Balasubramanian et al. |
| 2012/0078860 | A1 | 3/2012 | Roberts et al. |
| 2015/0220597 | A1 | 8/2015 | Simhadri et al. |

(Continued)

OTHER PUBLICATIONS

IBM, "Method for Querying a Class Hierarchy Stored in a Normalized Relationship Table Without Using Recursive SQL," IP.com Prior Art Database Technical Disclosure, IP.com No. IPCOM000125489D, Jun. 3, 2005, pp. 1-3.

(Continued)

*Primary Examiner* — Tyler J Torgrimson
(74) *Attorney, Agent, or Firm* — Lee & Hayes, P.C.

(57) ABSTRACT

Disclosed aspects relate to transforming a user-defined table function (UDTF) to a derived table in a database management system (DBMS). It may be detected by the DBMS that a query indicates the UDTF. A derived table may be constructed from the UDTF. The derived table may be derived from a set of statements of the UDTF. The derived table may be introduced to the query to fulfill the UDTF. A query plan may be generated for the query by the DBMS. The query plan may be generated in response to introducing the derived table in the query.

1 Claim, 5 Drawing Sheets

(56) References Cited

U.S. PATENT DOCUMENTS

| | | | | |
|---|---|---|---|---|
| 2015/0379077 | A1* | 12/2015 | Grosse | G06F 16/24542 707/718 |
| 2016/0125023 | A1* | 5/2016 | Plasek | G06F 16/2393 707/747 |
| 2016/0140205 | A1 | 5/2016 | Hsu et al. | |
| 2016/0342653 | A1 | 11/2016 | Chen et al. | |

OTHER PUBLICATIONS

Anonymous, "SQL Generator to Format Type Tables Into Columns," IP.com Prior Art Database Technical Disclosure, IP.com No. IPCOM000242226D, Jun. 26, 2015, pp. 1-2.

Forstie, S., "Inlining support for User Defined Table Functions (UDTFs)", International Business Machines Corporation, Oct. 10, 2016, pp. 1-2. <https://www.ibm.com/developerworks/community/wikis/home?lang=en#!/wiki/IBM%20i%20Technology%20Updates/page/Inlining%20support%20for%20User%20Defined%20Table%20Functions%20%28UDTFs%29>.

Aldrich et al., "Transforming a User-Defined Table Function to a Derived Table in a Database Management System," U.S. Appl. No. 15/406,678, filed Jan. 14, 2017.

Aldrich et al., "Transforming a User-Defined Table Function to a Derived Table in a Database Management Systems," U.S. Appl. No. 15/858,408, filed Dec. 29, 2017.

List of IBM Patents or Patent Applications Treated as Related, Signed Apr. 18, 2019, 2 pages.

Aldrich et al., "Transforming a User-Defined Table Function to a Derived Table in a Database Management System," U.S. Appl. No. 16/565,865, filed Sep. 10, 2019.

List of IBM Patents or Patent Applications Treated as Related, Signed Sep. 10, 2019, 2 pages.

\* cited by examiner

TRANSFORMING A USER-DEFINED TABLE FUNCTION TO A DERIVED TABLE IN A DATABASE MANAGEMENT SYSTEM

STATEMENT REGARDING PRIOR DISCLOSURES BY THE INVENTOR OR A JOINT INVENTOR

The following disclosure(s) are submitted under 35 U.S.C. 102(b)(1)(A): DB2 for i, Apr. 7, 2016.

BACKGROUND

This disclosure relates generally to database management systems and, more particularly, relates to transforming a user-defined table function (UDTF) to a derived table in a database management system (DBMS). Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to transform a UDTF to a derived table in a DBMS.

SUMMARY

Aspects of the disclosure relate to transforming a user-defined table function (UDTF) to a derived table in a database management system (DBMS). A set of structured query language (SQL) statements may be identified from within a UDTF of a database query. The UDTF may be inlined as a derived table or laterally correlated derived table within the database query. One or more optimization operations may be performed on the database query including the derived table to facilitate processing and execution. As such, by inlining the UDTF as a derived table or laterally correlated derived table, the set of SQL statements may be included within the database query such that calls to user code may be avoided, and optimization operations may be performed on the query and derived table as a whole.

Aspects of the disclosure relate to transforming a user-defined table function (UDTF) to a derived table in a database management system (DBMS). It may be detected by the DBMS that a query indicates the UDTF. A derived table may be constructed from the UDTF. The derived table may be derived from a set of statements of the UDTF. The derived table may be introduced to the query to fulfill the UDTF. A query plan may be generated for the query by the DBMS. The query plan may be generated in response to introducing the derived table in the query.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
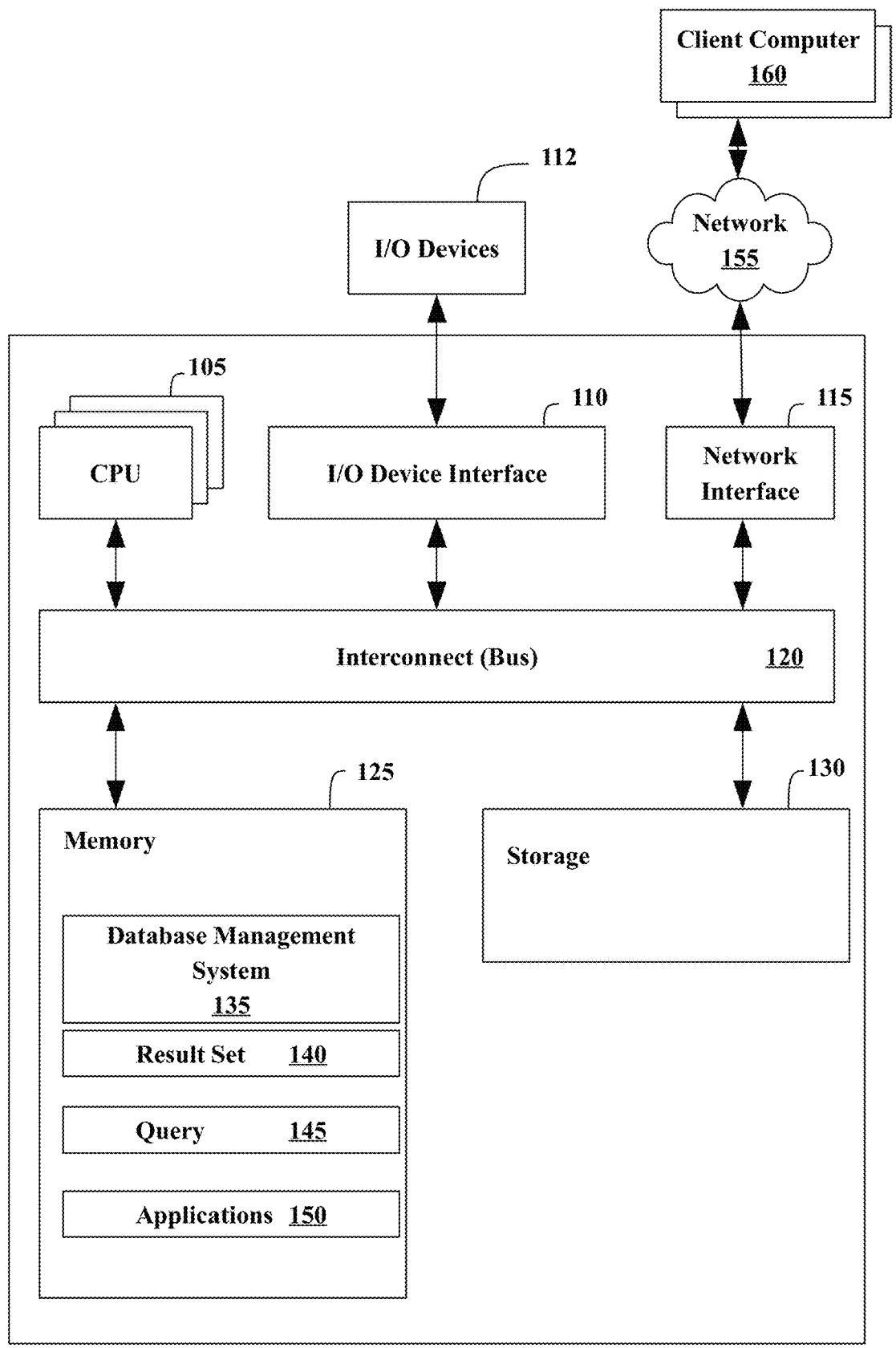
FIG. 1 illustrates an example representation of a computer system connected to a client computer via a network according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to transforming a user-defined table function (UDTF) to a derived table in a database management system (DBMS). A set of structured query language (SQL) statements may be identified from within a UDTF of a database query. The UDTF may be inlined as a derived table or laterally correlated derived table within the database query. One or more optimization operations may be performed on the database query including the derived table to facilitate processing and execution. As such, by inlining the UDTF as a derived table or laterally correlated derived table, the set of SQL statements may be included within the database query such that calls to user code may be avoided, and optimization operations may be performed on the query and derived table as a whole. Leveraging the use of derived tables with respect to queries in a database management system may be associated with resource usage efficiency, query processing, and database operation performance.

Within relational databases, user-defined table functions may be used to extend the functionality of databases by adding functions that can be evaluated in SQL statements. Aspects of the disclosure relate to the recognition that, in some situations, user-defined table functions may reference separate/external code libraries, such that query parsers may be required to access and invoke user-code from the external code libraries in order to implement the UDTF within the query (e.g., impacting database resource usage efficiency). Accordingly, aspects of the disclosure relate to identifying a set of SQL statements from within a UDTF, and introducing (e.g., inlining) the set of SQL statements into the database query as a derived table or laterally correlated derived table to positively impact query processing performance. As such, database queries may be processed without accessing external code libraries, and optimization operations may be performed on the query and the derived table as a whole (e.g., rather than performing separate optimization operations on the UDTF and the query independently).

Aspects of the disclosure include a method, system, and computer program product for transforming a user-defined table function (UDTF) to a derived table in a database management system (DBMS). It may be detected by the DBMS that a query indicates the UDTF. A derived table may be constructed from the UDTF. The derived table may be derived from a set of statements of the UDTF. The derived table may be introduced to the query to fulfill the UDTF. A query plan may be generated for the query by the DBMS. The query plan may be generated in response to introducing the derived table in the query.

In embodiments, a call to a UDTF may be bypassed with respect to the query plan for the query to streamline performance of the query. In embodiments, in response to introducing the derived table to the query, the query may be revised using the devised table to streamline performance of the query. In embodiments, the set of statements of the UDTF may be unwrapped to streamline generation of the query plan for the query. In embodiments, a laterally correlated derived table may be introduced for the derived table. In embodiments, a single optimization operation may be carried-out on the query in response to introducing the derived table to the query. Altogether, aspects of the disclosure may provide performance or efficiency benefits for transforming a UDTF to a derived table in a DBMS (e.g., speed, flexibility, responsiveness, resource usage, productivity). Aspects may save resources such as bandwidth, processing, or memory.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
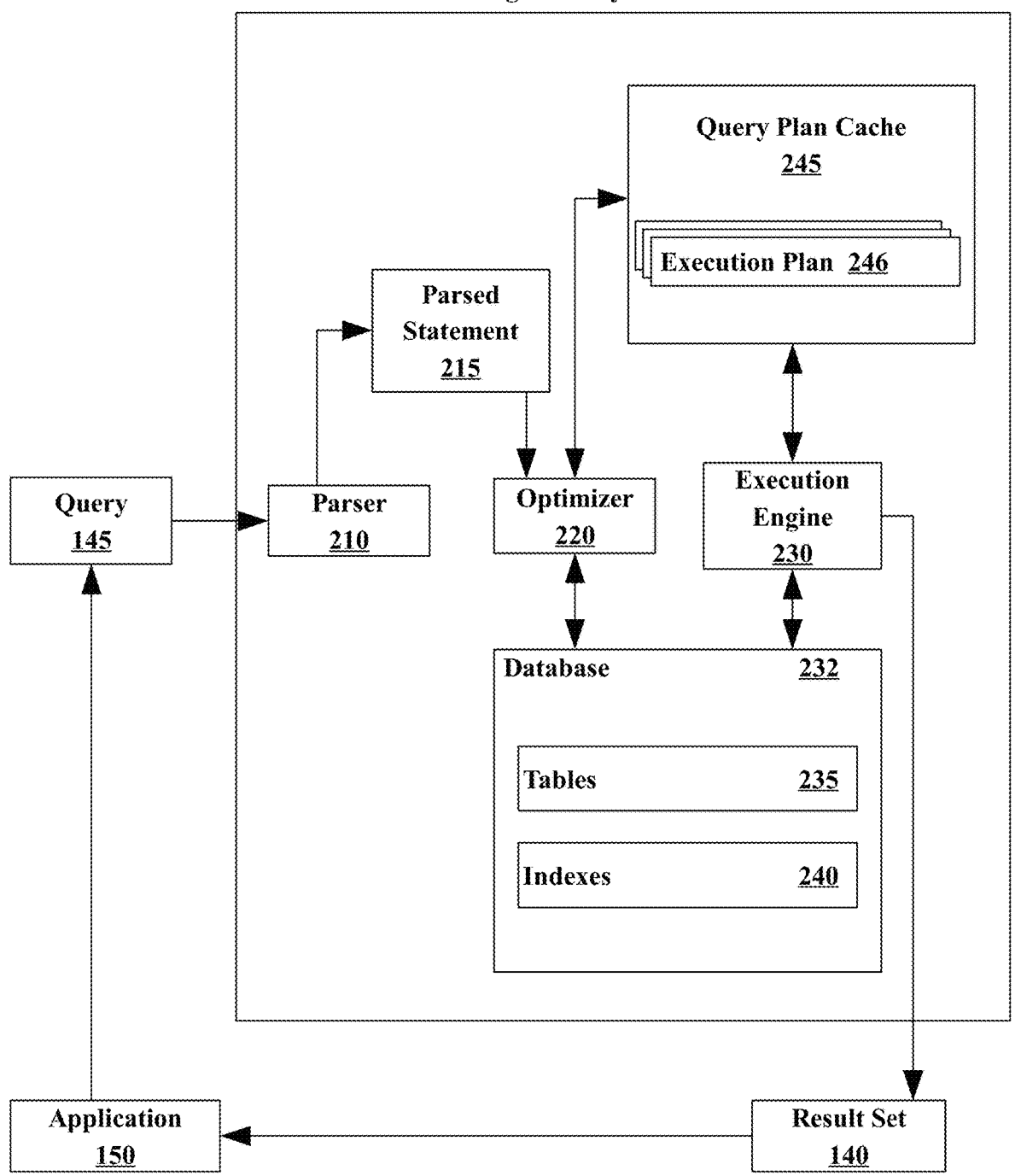
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
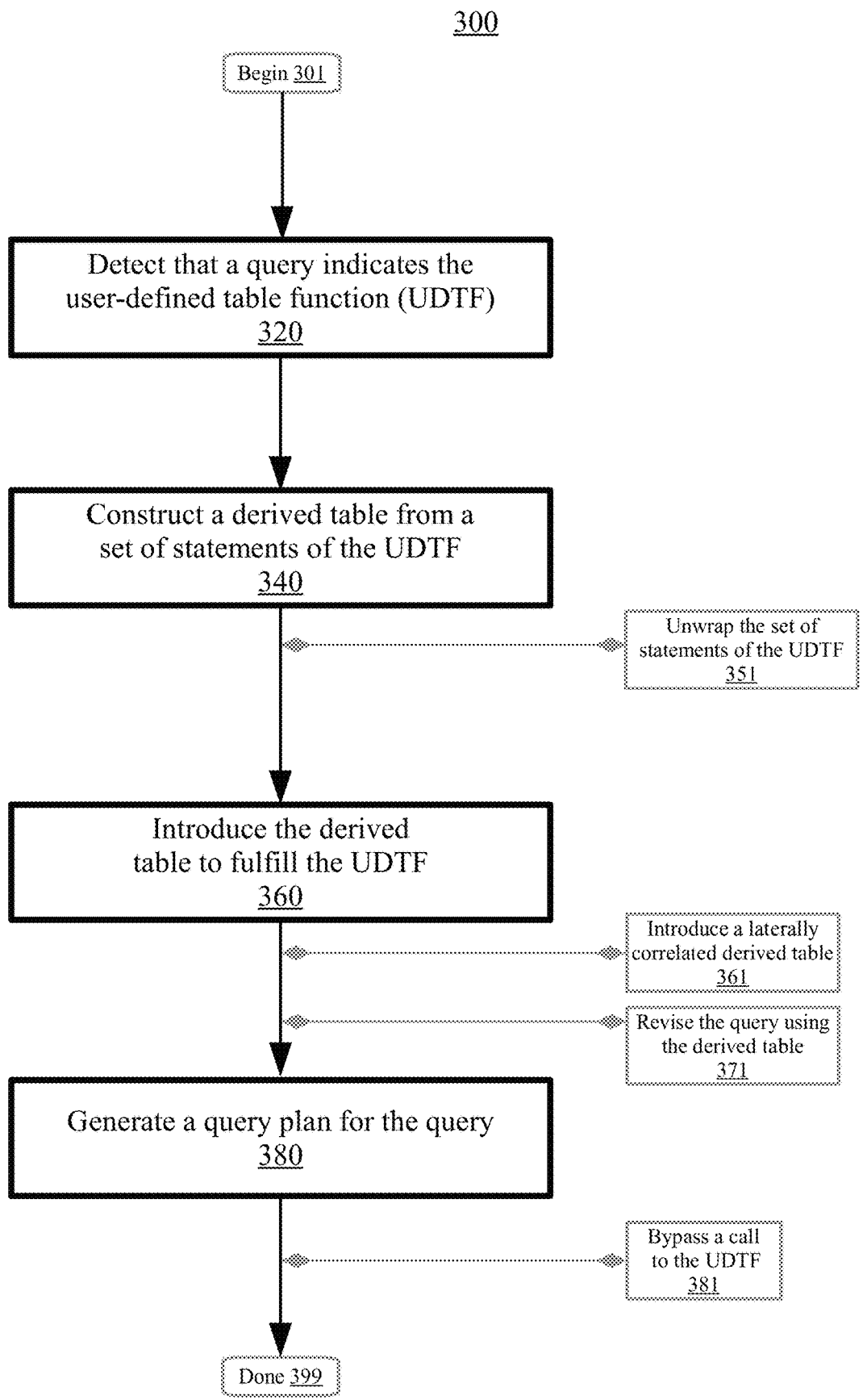
FIG. 3 is a flowchart illustrating a method for transforming a user-defined table function (UDTF) to a derived table in a DBMS, according to embodiments.

FIG. 3 is a flowchart illustrating a method 300 for transforming a UDTF to a derived table in a DBMS, according to embodiments. Aspects of FIG. 3 relate to introducing a derived table within a UDTF to facilitate processing of database queries. Aspects of the disclosure relate to the recognition that, in some situations, database queries may include user-defined table functions, such that query parsers may be required to invoke user-code from separate code libraries in order to implement the UDTF within the query (e.g., impacting database resource usage efficiency). Accordingly, aspects of the disclosure relate to identifying a set of SQL statements from within a UDTF, and introducing (e.g., inlining) the set of SQL statements into the database query as a derived table or laterally correlated derived table. Altogether, leveraging the use of derived tables with respect to queries in a database management system may be associated with resource usage efficiency, query processing, and database operation performance. The method 300 may begin at block 301.

At block 320, it may be detected by the DBMS that a query indicates the UDTF.

Generally, detecting can include sensing, discovering, collecting, recognizing, or otherwise receiving the query that indicates the UDTF. The query may include an inquiry, set of instructions, commands, or request for data or information from a database. The query may include a select query (e.g., data retrieval query), an action query (e.g., request for an operation such as insertion, updating, or deletion to be performed on a set of data), or other type of query. In embodiments, the query may be expressed in a query language such as SQL (Structured Query Language), CLSQL (Common List Structured Query Language), SchemeQL (Scheme Query Language), or the like. As described herein, the query may indicate a user-defined table function (UDTF). The UDTF may include a mechanism for allowing SELECT statements to be reused by multiple programs, and provide for performance of multiple statements before returning a final result set. The UDTF may be created or registered using a CREATE FUNCTION statement, and include a RETURNS TABLE clause to define the attributes of output columns. As examples, the UDTF may include a SQL UDTF that includes one or more SQL statements or an external UDTF (e.g., high-level programming language program registered with the CREATE FUNCTION statement). A query indicating the UDTF may be detected by the DBMS. In embodiments, detecting the query indicating the UDTF may include utilizing a query parsing tool to analyze the query, ascertain the structure of the query (e.g., syntax, types of functions/statements that are invoked), and identify that a UDTF is referenced within the query. As an example, a query may be parsed and it may be determined that the query includes a CREATE FUNCTION that invokes a UDTF. Accordingly, the query parsing tool may ascertain that the query includes a UDTF. Other methods of detecting that the query includes a UDTF are also possible.

At block 340, a derived table may be constructed from the UDTF. The derived table may be derived from a set of statements of the UDTF (e.g., from an internal SQL of the UDTF). Generally, constructing can include selecting, excerpting, capturing, acquiring, extricating, copying, generating, building, extracting or otherwise collecting the derived table from the UDTF. The derived table may include a table expression located in the FROM clause of an SQL statement. The derived table may be configured to select a set of data from a specified location, and return (e.g., output, materialize) the set of selected data within the query. For instance, in embodiments, the derived table may include a subquery that functions as a "subselect" or "fullselect" within the FROM clause of an SQL statement. As an example, a derived table may include a select clause that returns the maximum age value among a set of ages for a number of individuals. In embodiments, the derived table may include a laterally correlated derived table (e.g., derived table configured to receive input of data values). As described herein, the derived table may be derived from a set of statements of the UDTF. The set of statements may include a set of SQL statements, functions, commands, or clauses embedded within the UDTF. The set of statements may indicate, define, or otherwise characterize the derived table. In embodiments, constructing the derived table may include parsing the query to identify one or more SQL statements, and capturing the one or more SQL statements (e.g., for subsequent incorporation into the query). Other methods of constructing the derived table from the UDTF are also possible.

In embodiments, the set of statements of the UDTF may be unwrapped at block 351. The set of statements of the UDTF may be unwrapped to streamline generation of the query plan for the query. Generally, unwrapping can include unpacking, retrieving, opening, incorporating, fetching, or otherwise exposing the set of statements of the UDTF to streamline generation of a query plan for the query. In embodiments, unwrapping may include examining the set of statements, and retrieving (e.g., fetching, obtaining) a set of data indicated by the set of statements (e.g., tables, columns, or rows designated by a select clause). The retrieved data may be incorporated directly into the query in place of the UDTF. As an example, consider a query having a UDTF that includes a set of SQL statements that specify a subset of products from an inventory (e.g., products with a price less than $700) using a SELECT operation. Unwrapping may include parsing the set of SQL statements, identifying the data specified by the SELECT operation, and incorporating it directly into the query. Accordingly, the SQL constructs of the UDTF may be exposed to the entire query (e.g., avoiding the need for separate optimizations of the query and the UDTF independently). Other methods of unwrapping the set of statements of the UDTF are also possible.

At block 360, the derived table may be introduced to the query to fulfill the UDTF. As described herein, aspects of the disclosure relate to the recognition that, in some situations, executing a UDTF within a query may be associated with adverse impacts with respect to resource usage (e.g., separate user code libraries may need to be referenced, requiring additional system resources, longer processing time). Accordingly, aspects of the disclosure relate to transforming the UDTF to a derived table and introducing it directly into the database query. Generally, introducing can include adding, inserting, appending, integrating, combining, consolidating, assimilating, joining, or otherwise implementing the derived table to fulfill the UDTF. In embodiments, introducing the derived table to fulfill the UDTF may include superseding or replacing the UDTF with the derived table. In embodiments, introducing may include inlining the derived table with respect to the query. For instance, rather than invoking the set of statements of the UDTF within the query, the fullselect in the RETURN statement of the UDTF may be copied (e.g., inlined) into the query itself. In certain embodiments, introducing may include utilizing a query definition template to format (e.g., arrange, structure, organize) a set of SQL statements constructed from the UDTF in an internal structure that is consistent with rest of the query, and subsequently merging the formatted set of statements into the query as a derived table or a laterally correlated derived table. As such, the query may be processed without calling separate code libraries, and optimization operations may be performed on the entire query (e.g., rather than performing independent optimization operations on the UDTF and the rest of the query separately). Other methods of introducing the derived table to the query in order to fulfill the UDTF are also possible.

In embodiments, a laterally correlated derived table may be introduced for the derived table at block 361. Generally, introducing can include adding, inserting, appending, integrating, combining, consolidating, assimilating, joining, or otherwise implementing the laterally correlated derived table for the derived table. The laterally derived table may include a data structure that is configured to dynamically receive input parameters from an external source. For instance, the laterally derived table may include a subquery (e.g., derived table defined using the LATERAL keyword) that references a table, column, or other data set that appears earlier (e.g., to the left) in the same FROM clause. In embodiments, introducing the laterally derived table may include structuring the set of SQL statements of the UDTF based on a query definition template, and integrating the SQL statements into the query as a subquery defined by the LATERAL keyword to generate the laterally correlated derived table. The LATERAL keyword may specify an earlier table, column, or data set in the same FROM clause as an input to the laterally correlated derived table. For instance, the following query may include a laterally correlated derived table in the FROM clause, where t1_a is a lateral correlation reference:

```
Select * FROM t1,
    LATERAL (SELECT t2. a AS t2_a
        FROM t2 WHERE t2. = t1.a );
```

In embodiments, introduction of the laterally correlated derived table may positively impact resource usage with respect to the DBMS. For instance, in the event that the query is processed or executed multiple times, transformation of a UDTF to laterally correlated derived table may reduce the number of times a separate user code library needs to be called (e.g., without the laterally correlated derived table, a separate code library may need to be called on each execution of a UDTF, whereas introduction of a laterally correlated derived table may eliminate the need for external code library invocations). Other methods of introducing the laterally correlated derived table are also possible.

In embodiments, the query may be revised at block 371. The query may be revised in response to introducing the derived table to the query. The query may be revised using the derived table to streamline performance of the query. Generally, revising can include amending, adjusting, editing, altering, or otherwise modifying the query. In embodiments, revising the query may include implementing one or more changes with respect to the query based on the introduction of the derived table. In embodiments, revising may include analyzing the query (e.g., using a query parsing tool) in response to introduction of the derived table, and subsequently performing one or more operations to simplify the query for streamlined performance. For instance, revising the query may include combining or merging a plurality of elements (e.g., features, subqueries) into a lesser number of elements (e.g., combining redundant elements to decrease the number of operations and reduce the complexity of the query). In embodiments, revising the query may include blending the set of statements (e.g., SQL statements from the UDTF) into the query. As an example, blending may include rearranging the set of statements such that operations that make use of similar assets, access similar/the same memory locations, or otherwise share correlation with one another may be executed in an efficient manner. Other methods of revising the query in response to introducing the derived table to the query are also possible.

At block 380, a query plan may be generated for the query. The query plan may be generated by the DBMS in response to introducing the derived table in the query. Generally, generating can include formulating, instantiating, producing, creating, assembling, building, or otherwise establishing the query plan for the query. The query plan may include an ordered set of steps for performance of the query within the DBMS. The query plan may divide the query into a series of steps, indicate the order in which each step should be performed, and map the system resources expected to be used by each step of the query plan. For instance, the query plan may characterize the various attributes of operators involved in the query plan, provide a list of operator types, define the number of rows each operator consumes or produces, and predict the processor and memory resources that will be used by execution of the query. As examples, the query plan may include a graphical query plan (e.g., visual presentation of a user interface defining the query plan) a textual query plan (e.g., textual list of the operations included in the query plan), or other type of query plan. In embodiments, generating the query plan may include using a query optimization tool to evaluate the complexity, resource usage, and overall efficiency of a set of candidate query plans, and ascertaining a particular query plan from the set of candidate query plans for execution of the query. Other methods of generating the query plan in response to introducing the derived table to the query are also possible.

In embodiments, a call to the UDTF to streamline performance of the query may be bypassed at block 381. Aspects of the disclosure relate to the recognition that, in some situations, calling (e.g., invoking) a UDTF within a database query may be associated with referencing an external code library (e.g., adversely impacting resource usage of the DBMS). Accordingly, aspects of the disclosure relate to transforming the UDTF into a derived table, such that calling of the UDTF may be bypassed (e.g., saving system resources). The call to the UDTF may be bypassed with respect to the query plan for the query. Generally, bypassing can include avoiding, skipping, circumventing, disregarding, or otherwise omitting the call to the UDTF. In embodiments, bypassing may include executing the functionality of the UDTF (e.g., as indicated by the set of statements) without invoking the UDTF. For instance, bypassing may include parsing the set of SQL statements, and performing one or more database operations indicated by the set of SQL statements within the DBMS without calling the UDTF or accessing an external code library. In embodiments, subsequent to constructing a new SQL, the UDTF may be absent or no longer exist (e.g., as such the UDTF may be bypassed). Other methods of bypassing the call do the UDTF to streamline performance of the query are also possible.

Consider the following example. A database management system may receive and detect a database query that indicates a UDTF. For example, the following query may include an SQL table function that is configured to return a list of employees in a specified department. As described herein, the query may include a CREATE FUNCTION (e.g., or a REPLACE FUNCTION) that indicates the UDTF as shown below:

```
CREATE OR REPLACE FUNCTION DEPTEMPLOYEES (DEPTNO
CHAR(3))
RETURNS TABLE (EMPNO CHAR(6),
LASTNAME VARCHAR(15),
FIRSTNAME VARCHAR(12))
LANGUAGE SQL
READS SQL DATA
NO EXTERNAL ACTION
DETERMINISTIC
CALLED ON NULL INPUT
RETURN
SELECT EMPNO, LASTNAME, FIRSTNME
FROM EMPLOYEE
WHERE EMPLOYEE.DEPTNO = DEPTEMPLOYEES.DEPTNO;
```

As described herein, a derived table derived from a set of SQL statements of the UDTF may be constructed from the query. For example, in certain embodiments, the SQL table function from the above query may be constructed and formatted as the following derived table "SELECT*FROM TABLE (DEPTEMPLOYEES (CHAR('45X'))) AS D." Accordingly, as described herein, the derived table may be introduced to the query (e.g., superseding or replacing the UDTF). As an example, the original query from above may be rewritten to include the derived table as shown below.

```
SELECT * FROM TABLE
( SELECT EMPNO, LASTNAME, FIRSTNME FIRSTNAME
FROM EMPLOYEE
WHERE EMPLOYEE.DEPTNO = CHAR('45X') ) AS A;
```

In this way, the functionality of the UDTF may be executed within the query as a derived table without calling the UDTF. Other methods of transforming a user-defined table function to a derived table in a database management system are also possible.

Method 300 concludes at block 399. Aspects of method 300 may provide performance or efficiency benefits for transforming a UDTF to a derived table in a DBMS. As an example, a user-defined table function of a query may be transformed to a derived table or a laterally correlated derived table such that invocation of the UDTF may be avoided (e.g., saving system resources) and optimization operations may be performed on the query as a whole (e.g., positively impacting query optimization efficiency). Altogether, leveraging the use of derived tables with respect to queries in a database management system may be associated with resource usage efficiency, query processing, and database operation performance.

Figure 4:
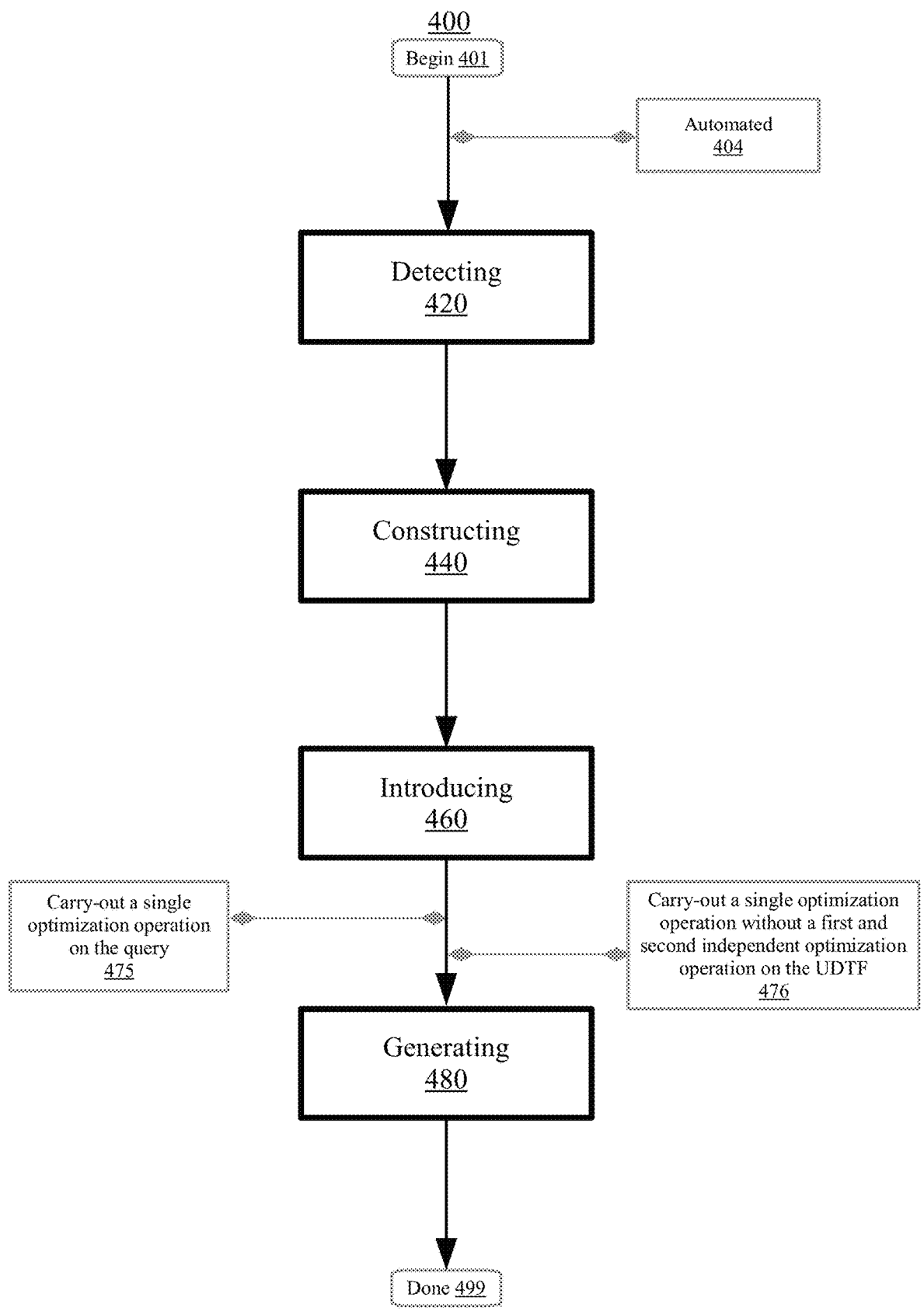
FIG. 4 is a flowchart illustrating a method for transforming a UDTF to a derived table in a DBMS, according to embodiments.

FIG. 4 is a flowchart illustrating a method 400 for transforming a UDTF to a derived table in a DBMS, according to embodiments. Aspects of method 400 may be similar or the same as aspects of method 300, and aspects may be utilized interchangeably with one or more methodologies described herein. The method 400 may begin at block 401. At block 420, it may be detected by the DBMS that a query indicates the UDTF. At block 440, a derived table may be constructed from the UDTF. The derived table may be derived from a set of statements of the UDTF. At block 460, the derived table may be introduced to the query to fulfill the UDTF. At block 480, a query plan may be generated for the query. The query plan may be generated by the DBMS in response to introducing the derived table in the query. Altogether, leveraging the use of derived tables with respect to queries in a database management system may be associated with resource usage efficiency, query processing, and database operation performance.

In embodiments, the detecting, the constructing, the introducing, the generating, and the other steps described herein may each occur in an automated fashion at block 404. The operational steps described herein may occur in an automated fashion without user intervention. In embodiments, the detecting, the constructing, the introducing, the generating, and the other steps described herein may be carried out by an internal UDTF transformation module maintained in a persistent storage device of a local computing device (e.g., communicatively connected with the DBMS; local computer or server connected to a local network). In embodiments, the detecting, the constructing, the introducing, the generating, and the other steps described herein may be carried out by an external UDTF transformation module hosted by a remote computing device or server (e.g., server accessible via a subscription, usage-based, or other service model). In this way, aspects of UDTF transformation management may be performed using automated computing machinery without manual action. Other methods of performing the steps described herein are also possible.

In embodiments, a single optimization operation may be carried-out on the query at block 475. The single optimization operation may be carried-out with respect to the query and the derived table. The single optimization operation may be carried-out in response to introducing the derived table to the query. Aspects of the disclosure relate to the recognition that in some situations, (e.g., in which the UDTF has not been integrated into the query as a derived table), it may be necessary to perform separate optimization operations on the query and the UDTF independently. Accordingly, aspects of the disclosure relate to carrying-out a single optimization operation on the query. Generally, carrying-out can include implementing, completing, instantiating, performing, processing, or otherwise executing the single optimization operation on the query. The single optimization operation may include a process, procedure, sequence of steps, or other action configured to modify the query to facilitate performance. The single optimization operation may be configured to combine, add, delete, or otherwise modify one or more features (e.g., syntax, operational constraints, variables) of the query to simplify the query in order to facilitate efficient performance. In embodiments, carrying-out the single optimization operation may include examining the query subsequent to introduction of the derived table (e.g., such that the derived table and the rest of the query may be analyzed at the same time) and ascertaining one or more elements of the query that may be combined, merged, deleted, or simplified to positively impact execution of the query. As an example, the query may be evaluated together with the derived table, and it may be ascertained that a first operation called by the derived table achieves a similarity threshold with respect to a second operation of the query (e.g., both the first and second operations call the same memory location). Accordingly, carrying-out the single optimization operation may include merging the first and second operations into a single operation to simplify the query. Other methods of carrying-out the single optimization operation with respect to the query and the derived table are also possible.

In embodiments, a single optimization operation may be carried-out on the query at block 476. The single optimization operation may be carried-out without a first independent optimization operation on the query and without a second independent optimization operation on the UDTF. The single optimization operation may be carried-out in response to introducing the derived table to the query. Aspects of the disclosure relate to the recognition that in some situations (e.g., in which the UDTF has not been integrated into the query as a derived table), it may be necessary to perform separate optimization operations on the query and the UDTF independently. Accordingly, aspects of the disclosure relate to carrying-out a single optimization operation on the query. Generally, carrying-out can include implementing, completing, instantiating, performing, processing, or otherwise executing the single optimization operation on the query. In embodiments, carrying-out the single optimization operation may include detecting introduction of the derived table to the query, and initiating performance of the single optimization operation with respect to the query as a whole (e.g., the query and the introduced derived table). In certain embodiments, carrying-out may include waiting for introduction of a set of derived table introduction operations to complete, and subsequently performing a single optimization operation on the entire query and the set of introduced derived tables. As an example, with respect to a query including four separate UDTFs, a query parsing tool may monitor the query for changes to the syntax of each UDTF (e.g., transformation to a derived table), and be configured to perform the single optimization operation on the query in response to detecting that derived tables have been introduced for each of the four UDTFs. In this way, a single optimization operation may be performed with respect to the query without separate optimization operations on each individual UDTF. Other methods of carrying-out the single optimization operation with respect to the query and the derived tables are also possible. Method 400 concludes at block 499. Aspects of method 400 may provide performance or efficiency benefits for transforming a UDTF to a derived table in a DBMS.

Figure 5:
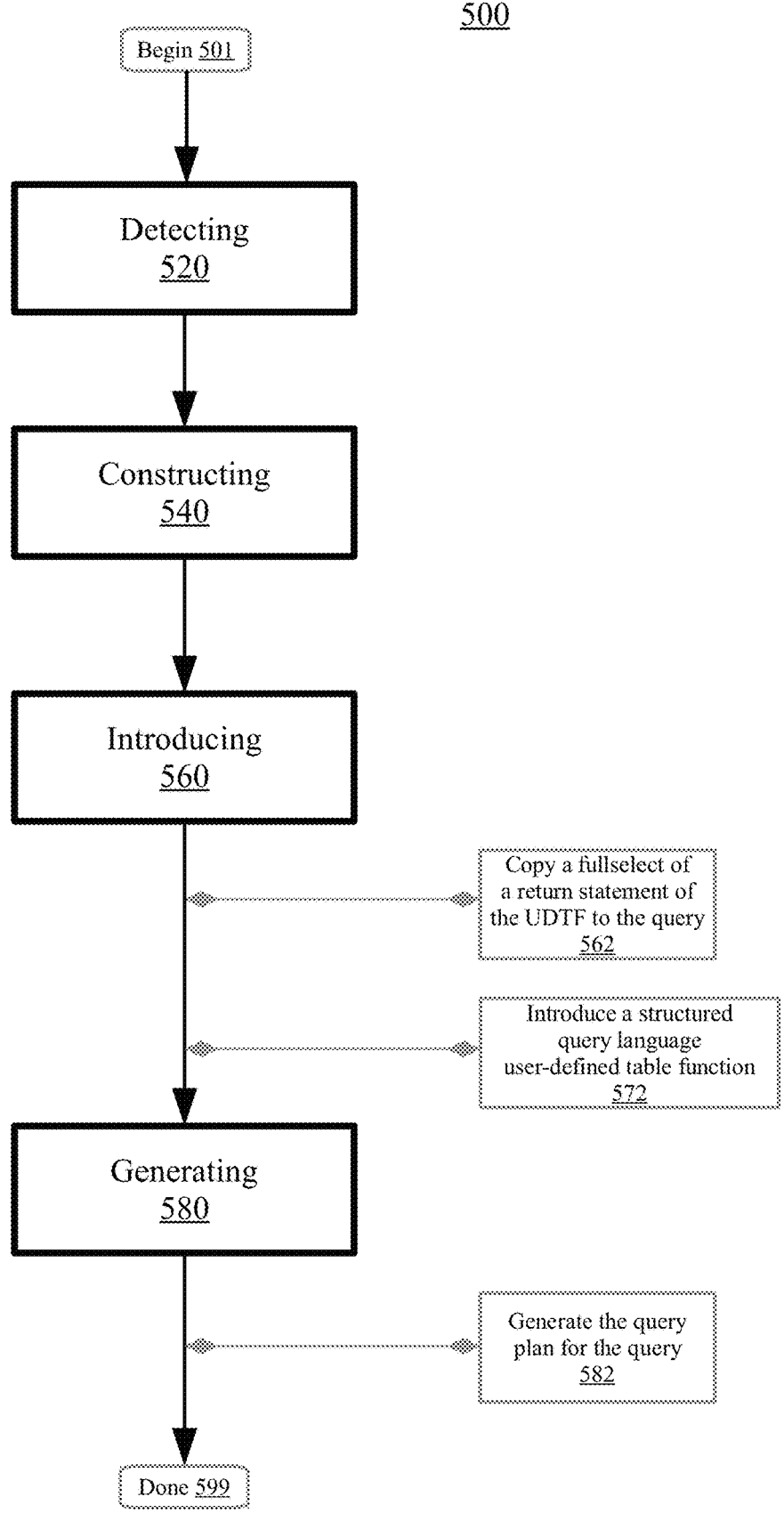
FIG. 5 is a flowchart illustrating a method for transforming a UDTF to a derived table in a DBMS, according to embodiments.

FIG. 5 is a flowchart illustrating a method 500 for transforming a UDTF to a derived table in a DBMS, according to embodiments. Aspects of method 500 may be similar or the same as aspects of method 300/400, and aspects may be utilized interchangeably with one or more methodologies described herein. The method 500 may begin at block 501. At block 520, it may be detected by the DBMS that a query indicates the UDTF. At block 540, a derived table may be constructed from the UDTF. The derived table may be derived from a set of statements of the UDTF. At block 560, the derived table may be introduced to the query to fulfill the UDTF. At block 580, a query plan may be generated for the query. The query plan may be generated by the DBMS in response to introducing the derived table in the query. Altogether, leveraging the use of derived tables with respect to queries in a database management system may be associated with resource usage efficiency, query processing, and database operation performance.

In embodiments, a fullselect of a return statement of the UDTF may be copied to the query at block 562. The fullselect of a return statement of the UDTF may be copied to introduce the derived table to fulfill the UDTF. Generally, copying can include duplicating, transcribing, reproducing, or otherwise replicating the fullselect of the return statement of the UDTF to the query. The fullselect of the return statement may include a component of a select-statement, INSERT statement, CREATE VIEW statement, or predicate that specifies a table to be returned as a result (e.g., of a query, operation). In embodiments, copying may include constructing the fullselect from the return statement of the UDTF, and replacing the UDTF with fullselect in the query. In certain embodiments, copying the fullselect of the return statement may include identifying a set of values (e.g., columns, rows, data set) indicated by the fullselect of the return statement, and inserting them into the query in place of the UDTF in the query. Other methods of copying the fullselect of the return statement of the UDTF into the query are also possible.

In embodiments, a structured query language user-defined table function (SQLUDTF) may be introduced as the derived table at block 572. Generally, introducing can include adding, inserting, appending, integrating, combining, consolidating, assimilating, joining, or otherwise implementing the SQLUDTF as the derived table in the query. The SQLUDTF may include a UDTF created using a CREATE FUNCTION statement that includes one or more SQL statements. In embodiments, introducing the SQLUDTF may include identifying the set of SQL statements included in a UDTF, and directly reproducing them in the query. In embodiments, introducing the SQLUDTF may include identifying a set of non-SQL statements of the UDTF, converting them to SQL statements, and using the converted SQL statements to generate a SQLUDTF for inclusion in the query as a derived table. In embodiments, introducing the SQLUDTF may include using the set of SQL statements included in the UDTF to construct a derived table configured to perform the same function as the UDTF, and integrating the SQLUDTF-derived table into the query. Other methods of introducing the SQLUDTF in the query as the derived table are also possible.

In embodiments, the query plan may be generated for the query at block 582. The query plan may be generated for the query based on and in response to introducing the derived table to the query. The query plan may be generated for the query to order a set of commands using the derived table. Generally, generating can include formulating, instantiating, producing, creating, assembling, building, or otherwise establishing the query plan to order the set of commands using the derived table. The set of commands may include a list, group, or organization of steps, procedures, operations, or actions to be carried out in order to perform the query within the DBMS. Ordering the set of commands may include defining a chronological sequence in which the set of commands are to be executed as part of the query plan. For instance, ordering the set of commands may include assigning a queue position number (e.g., 1-5) to each command of the set of commands to indicate a suggested temporal progression/arrangement for execution of the query. In embodiments, ordering may include examining the content of the query, and ascertaining a candidate order for the set of commands based on the function, expected resource usage, historical performance records, and other attributes of the operations included in the query. As an example, consider a query that includes 4 different commands. The query may be analyzed, and it may be ascertained that the first command and the third command both access the same memory page, and that the second and fourth command both access the same code library. As described herein, generating the query plan may include assigning an order to each command based on the resources it uses. For instance, in embodiments, the first command may be given an order of "1," the third command may be given an order of "2," the second command may be given an order of "3," and the fourth command may be given an order of "4." In this way, the first and second commands may be performed consecutively using the corresponding memory page, and the third and fourth commands may be performed consecutively using the corresponding code library (e.g., to avoid having to reload assets into memory multiple times). Other methods of generating the query plan to order the set of commands are also possible.

As described herein, aspects of the disclosure relate to introducing a laterally correlated derived table to a query to facilitate query processing efficiency and performance. Consider the following example. A database management system may receive and detect a database query that indicates a UDTF. For example, the following query may include an SQL table function that is configured to return a list of employees in a specified department. As described herein, aspects of the disclosure relate to inlining the SQL table function as a laterally correlated derived table. As shown below, the query may include a CREATE FUNCTION (e.g., or a REPLACE FUNCTION) that indicates the UDTF as shown below:

```
CREATE OR REPLACE FUNCTION DEPTEMPLOYEES (DEPTNO CHAR(3))
RETURNS TABLE (EMPNO CHAR(6),
LASTNAME VARCHAR(15),
FIRSTNAME VARCHAR(12))
LANGUAGE SQL
READS SQL DATA
NO EXTERNAL ACTION
DETERMINISTIC
RETURNS NULL ON NULL INPUT
RETURN
SELECT EMPNO, LASTNAME, FIRSTNME
FROM EMPLOYEE
WHERE EMPLOYEE.DEPTNO = DEPTEMPLOYEES.DEPTNO;
```

As described herein, a laterally correlated derived table derived from a set of SQL statements of the UDTF may be constructed from the query. For example, in certain embodiments, the SQL table function from the above query may be constructed and formatted as the following laterally correlated derived table "SELECT*FROM DEPARTMENT A CROSS JOIN TABLE (DEPTEMPLOYEES (A.DEPTNO)) AS D, ORDER BY A.DEPTNO." Accordingly, as described herein, the laterally correlated derived table may be introduced to the query (e.g., superseding or replacing the UDTF). As an example, the original query from above may be rewritten to include the laterally correlated derived table as shown below:

```
SELECT * FROM DEPARTMENT A CROSS JOIN LATERAL
( SELECT EMPNO, LASTNAME, FIRSTNME FIRSTNAME
FROM LATERAL
( SELECT EMPNO, LASTNAME, FIRSTNME
FROM EMPLOYEE
WHERE EMPLOYEE.DEPTNO = A.DEPTNO) AS B
WHERE A.DEPTNO IS NOT NULL ) AS D
ORDER BY A.DEPTNO
```

In this way, the functionality of the UDTF may be executed within the query as a laterally correlated derived table without calling the UDTF. Other methods of transforming a user-defined table function to a derived table in a database management system also possible. Method 500 concludes at block 599. Aspects of method 500 may provide performance or efficiency benefits for transforming a UDTF to a derived table in a DBMS.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for transforming a user-defined table function (UDTF) to a derived table in a database management system (DBMS), the method comprising:
    detecting, by the DBMS, that a query indicates the UDTF;
    constructing, from the UDTF, a derived table which is derived from a set of statements of the UDTF;
    unwrapping the set of statements of the UDTF, wherein the unwrapping comprises:
        examining the set of statements of the UDTF; and
        retrieving a set of data indicated by the set of statements of the UDTF;
    introducing, to the query, the derived table to fulfill the UDTF, wherein, the derived table is introduced as a laterally correlated derived table, the introducing comprising:
        structuring the set of statements of the UDTF based on a query definition template; and
        integrating the set of statements of the UDTF into the query as a subquery;
    revising, in response to introducing the derived table to the query, the query using the derived table to streamline performance of the query; and
    generating, by the DBMS in response to introducing the derived table in the query, a query plan for the query.

* * * * *